US011620321B2

(12) United States Patent
Chen et al.

(10) Patent No.: US 11,620,321 B2
(45) Date of Patent: Apr. 4, 2023

(54) ARTIFICIAL INTELLIGENCE BASED METHOD AND APPARATUS FOR PROCESSING INFORMATION

(71) Applicant: Beijing Baidu Netcom Science and Technology Co., Ltd., Beijing (CN)

(72) Inventors: Yile Chen, Beijing (CN); Jianfeng Chi, Beijing (CN); Jinwen Luo, Beijing (CN); Weidong Guo, Beijing (CN); Yajuan Lv, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 943 days.

(21) Appl. No.: 15/933,653

(22) Filed: Mar. 23, 2018

(65) Prior Publication Data

US 2019/0005126 A1 Jan. 3, 2019

(30) Foreign Application Priority Data

Jun. 29, 2017 (CN) .......................... 201710515764.8

(51) Int. Cl.
| | |
|---|---|
| *G06F 16/35* | (2019.01) |
| *G06K 9/62* | (2022.01) |
| *G06N 20/00* | (2019.01) |
| *G06F 16/33* | (2019.01) |
| *G06N 5/022* | (2023.01) |
| *G06N 3/04* | (2023.01) |

(52) U.S. Cl.
CPC .......... *G06F 16/35* (2019.01); *G06F 16/3347* (2019.01); *G06K 9/6201* (2013.01); *G06N 5/022* (2013.01); *G06N 20/00* (2019.01); *G06N 3/0454* (2013.01)

(58) Field of Classification Search
CPC .............................. G06F 16/248; G06F 16/35
See application file for complete search history.

(56) References Cited

U.S. PATENT DOCUMENTS

| | | | | |
|---|---|---|---|---|
| 8,577,915 | B2 * | 11/2013 | Barve | .................. G06F 16/248 |
| | | | | 707/769 |
| 9,990,368 | B2 * | 6/2018 | Walid | .................... G06F 16/148 |
| 10,311,362 | B1 * | 6/2019 | Mirza | .................... G06Q 10/10 |
| 10,810,193 | B1 * | 10/2020 | Subramanya | ....... G06F 16/9024 |

(Continued)

FOREIGN PATENT DOCUMENTS

| | | |
|---|---|---|
| CN | 101976246 A | 2/2011 |
| CN | 102214207 A | 10/2011 |

(Continued)

*Primary Examiner* — Mohammad S Rostami
(74) *Attorney, Agent, or Firm* — Nixon Peabody LLP

(57) ABSTRACT

An artificial intelligence based method and apparatus for processing information. A specific embodiment of the method includes: acquiring a search record set within a preset time period; matching the search record set with an encyclopedia entry set, and selecting a first set of points of interest from the encyclopedia entry set according to a match result; matching the search record set with a microblog topic set, and selecting a second set of points of interest from the microblog topic set according to a match result; and adding the first set of points of interest and the second set of points of interest to a set of points of interest. This embodiment achieves an accurate acquisition of the points of interest, thus facilitating the implementation of a targeted information push.

14 Claims, 4 Drawing Sheets

(56) References Cited

U.S. PATENT DOCUMENTS

| | | | |
|---|---|---|---|
| 2007/0136418 A1 | 6/2007 | Wolfe | |
| 2007/0282811 A1* | 12/2007 | Musgrove | G06F 16/2423 |
| 2009/0024572 A1* | 1/2009 | Mehta | G06F 16/24542 |
| 2010/0070386 A1* | 3/2010 | Gonzalez | G06Q 30/0601 |
| | | | 705/26.1 |
| 2012/0254143 A1* | 10/2012 | Varma | G06F 40/30 |
| | | | 707/706 |
| 2012/0259850 A1* | 10/2012 | Liu | G06F 16/951 |
| | | | 707/E17.046 |
| 2013/0103624 A1* | 4/2013 | Thieberger | G06Q 10/063 |
| | | | 706/12 |
| 2014/0108200 A1* | 4/2014 | Ning | G06F 16/332 |
| | | | 705/26.62 |
| 2015/0193482 A1 | 7/2015 | Kaushansky et al. | |
| 2015/0294011 A1* | 10/2015 | Tang | G06F 16/972 |
| | | | 707/722 |
| 2016/0364459 A1* | 12/2016 | Lu | G06F 16/248 |
| 2017/0053357 A1* | 2/2017 | Bowman | G06F 16/2471 |
| 2017/0109655 A1* | 4/2017 | Miyazaki | G06N 5/02 |
| 2017/0125013 A1* | 5/2017 | Yan | G10L 15/06 |
| 2017/0161619 A1* | 6/2017 | Franceschini | G06N 5/022 |
| 2017/0185653 A1* | 6/2017 | Huang | G06F 16/2468 |
| 2017/0206797 A1* | 7/2017 | Solomon | G06N 3/006 |
| 2018/0232438 A1* | 8/2018 | Gu | G06F 16/338 |
| 2018/0246974 A1* | 8/2018 | Shukla | G06F 16/9535 |
| 2018/0253496 A1* | 9/2018 | Natchu | H04L 67/02 |
| 2018/0293241 A1* | 10/2018 | Chittar | G06F 16/24578 |
| 2018/0349517 A1* | 12/2018 | Kleiman-Weiner | G06F 16/904 |
| 2019/0005024 A1* | 1/2019 | Somech | H04L 51/36 |
| 2019/0102706 A1* | 4/2019 | Frank | G06Q 10/063 |

FOREIGN PATENT DOCUMENTS

| | | |
|---|---|---|
| CN | 102930022 A | 2/2013 |
| CN | 103793434 A | 5/2014 |
| CN | 104008109 A | 8/2014 |
| CN | 105512298 A | 4/2016 |
| CN | 105550282 A | 5/2016 |
| CN | 105930539 A | 9/2016 |
| CN | 106202312 A | 12/2016 |

* cited by examiner

ARTIFICIAL INTELLIGENCE BASED METHOD AND APPARATUS FOR PROCESSING INFORMATION

CROSS-REFERENCE TO RELATED APPLICATIONS

This application is related to and claims priority from Chinese patent application no. 201710515764.8, filed with the state intellectual property office (SIPO) of the People's Republic of China on Jun. 29, 2017, the entire disclosure of the Chinese patent application is hereby incorporated by reference.

TECHNICAL FIELD

The present disclosure relates to the field of computer technology, specifically to the field of Internet technology, and more specifically to an artificial intelligence based method and apparatus for processing information.

BACKGROUND

The rapid development of Artificial Intelligence (AI) technology has facilitated people's daily work and life. Artificial intelligence is a new technological science which researches on and develops theories, methods, techniques and application systems for simulating, extending and expanding human intelligence. As a branch of the computer science, artificial intelligence attempts to learn the principle of intelligence and produce a novel intelligent machine capable of making response in a way similar to human intelligence. The researches in this field include robot, language recognition, image recognition, natural language processing and expert systems, etc. As artificial intelligence has been increasingly integrated into applications, the artificial intelligence integrated applications may accurately acquire the user's point of interest, and push relevant information for the user in accordance with the user's point of interest.

With the rapid development of the Internet and the new media today, there is a wide variety of network information, and it becomes very important as to how to push information in a targeted manner. In order to solve this problem, how to accurately acquire the user's point of interest becomes a problem worth studying.

SUMMARY

The objective of embodiments of the present disclosure is to provide an improved artificial intelligence based method and apparatus for processing information, in order to solve the technical problem mentioned in the foregoing Background section.

In a first aspect, the embodiments of the present disclosure provide an artificial intelligence based method for processing information, the method including: acquiring a search record set within a preset time period; matching the search record set with an encyclopedia entry set, and selecting a first set of points of interest from the encyclopedia entry set according to a match result; matching the search record set with a microblog topic set, and selecting a second set of points of interest from the microblog topic set according to a match result; and adding the first set of points of interest and the second set of points of interest to a set of points of interest.

In some embodiments, a search record includes a search formula and a search volume, an encyclopedia entry includes an entry name and an entry content; and the matching the search record set with an encyclopedia entry set, and selecting a first set of points of interest from the encyclopedia entry set according to a match result includes: matching search formulae of search records in the search record set with entry contents of encyclopedia entries in the encyclopedia entry set, acquiring successfully matched encyclopedia entries as candidate encyclopedia entries to generate a candidate encyclopedia entry set; and selecting entry names of the candidate encyclopedia entries from the candidate encyclopedia entry set as first points of interest to generate the first set of points of interest.

In some embodiment, an encyclopedia entry further includes an entry category and an entry reading quantity; and the selecting entry names of the candidate encyclopedia entries from the candidate encyclopedia entry set as first points of interest to generate the first set of points of interest includes: determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity; selecting candidate encyclopedia entries satisfying the first preset condition in the candidate encyclopedia entry set; and determining entry names of the selected candidate encyclopedia entries as the first points of interest to generate the first set of points of interest.

In some embodiments, a search record includes a search formula and a search volume, a microblog topic includes a topic name and a topic content; and the matching the search record set with a microblog topic set, and selecting a second set of points of interest from the microblog topic set according to a match result includes: matching search formulae of search records in the search record set with topic contents of microblog topics in the microblog topic set, acquiring successfully matched microblog topics as candidate microblog topics to generate a candidate microblog topic set; and selecting topic names of the candidate microblog topics from the candidate microblog topic set as second points of interest to generate the second set of points of interest.

In some embodiment, the microblog topic further includes a topic category and a topic reading quantity; and the selecting topic names of the candidate microblog topics from the candidate microblog topic set as second points of interest to generate the second set of points of interest includes: determining respectively whether the candidate microblog topics in the candidate microblog topic set satisfying a second preset condition, wherein the second preset condition includes a topic category of topic categories in a preset topic category set and a topic reading quantity greater than a preset topic reading quantity; selecting candidate microblog topics satisfying the second preset condition in the candidate microblog topic set; and determining topic names of the selected candidate microblog topics as the second points of interest to generate the second set of points of interest.

In some embodiments, the method further includes: extracting respectively feature vectors of search records in the search record set; inputting the feature vectors of the search records in the search record set into a pre-trained classification model to obtain categories of the search records in the search record set, wherein the classification model is used to characterize a correspondence between the feature vectors of the search records and the categories of the search records, and the categories of the search records including a point of interest category and a non-point-of-interest category; selecting from search records of the point of interest category in the search record set a third set of points of interest; and adding the third set of points of interest to the set of points of interest.

In some embodiments, the extracting respectively feature vectors of search records in the search record set includes: acquiring respectively feature data of the search records in the search record set, wherein the feature data includes at least one of: a search formula, a uniform resource locator, a search time, a search volume, a click time and a click volume; and extracting respectively the feature vectors of the search records in the search record set from the feature data of the search records in the search record set.

In some embodiments, the method further includes training the classification model, the training the classification model including: acquiring a sample search record and a category of the sample search record; extracting a feature vector of the sample search record; and training, using a machine learning method, to obtain the classification model, by using the feature vector of the sample search record as an input, and the category of the sample search record as an output.

In some embodiments, the method further includes: acquiring periodically a periodic search record set, wherein a periodic search record includes a periodic search formula and a periodic search volume; matching respectively points of interest in the set of points of interest in the periodic search record set, acquiring periodic search volumes of successfully matched periodic search records as search volumes of the points of interest in the set of points of interest; determining respectively whether the search volumes of the points of interest in the set of points of interest is less than a search volume threshold; and deleting points of interest of search volumes less than the search volume threshold from the set of points of interest.

In a second aspect, the embodiments of the present disclosure provides an artificial intelligence based apparatus for processing information, the apparatus including: a first acquisition unit, configured for acquiring a search record set within a preset time period; a first selection unit, configured for matching the search record set with an encyclopedia entry set, and selecting a first set of points of interest from the encyclopedia entry set according to a match result; a second selection unit, configured for matching the search record set with a microblog topic set, and selecting a second set of points of interest from the microblog topic set according to a match result; and a first addition unit, configured for adding the first set of points of interest and the second set of points of interest to a set of points of interest.

In some embodiments, a search record includes a search formula and a search volume, an encyclopedia entry includes an entry name and an entry content; and the first selection unit includes: a first match subunit, configured for matching search formulae of search records in the search record set with entry contents of encyclopedia entries in the encyclopedia entry set, acquiring successfully matched encyclopedia entries as candidate encyclopedia entries to generate a candidate encyclopedia entry set; and a first selection subunit, configured for selecting entry names of the candidate encyclopedia entries from the candidate encyclopedia entry set as first points of interest to generate the first set of points of interest.

In some embodiment, an encyclopedia entry further includes an entry category and an entry reading quantity; and the first selection subunit includes: a first determination module, configured for determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity; a first selection module, configured for selecting candidate encyclopedia entries satisfying the first preset condition in the candidate encyclopedia entry set; and a first generation module, configured for determining entry names of the selected candidate encyclopedia entries as the first points of interest to generate the first set of points of interest.

In some embodiments, a search record includes a search formula and a search volume, a microblog topic includes a topic name and a topic content; and the second selection unit includes: a second match subunit, configured for matching search formulae of search records in the search record set with topic contents of microblog topics in the microblog topic set, acquiring successfully matched microblog topics as candidate microblog topics to generate a candidate microblog topic set; and a second match subunit, configured for matching search formulae of search records in the search record set with topic contents of microblog topics in the microblog topic set, acquiring successfully matched microblog topics as candidate microblog topics to generate a candidate microblog topic set.

In some embodiment, a microblog topic further includes a topic category and a topic reading quantity; and the second selection subunit includes: a second determination module, configured for determining respectively whether the candidate microblog topics in the candidate microblog topic set satisfying a second preset condition, wherein the second preset condition includes a topic category of topic categories in a preset topic category set and a topic reading quantity greater than a preset topic reading quantity; a second selection module, configured for selecting candidate microblog topics satisfying the second preset condition in the candidate microblog topic set; and a second generation module, configured for determining topic names of the selected candidate microblog topics as the second points of interest to generate the second set of points of interest.

In some embodiments, the apparatus further includes: an extraction unit, configured for extracting respectively feature vectors of search records in the search record set; a classification unit, configured for inputting the feature vectors of the search records in the search record set into a pre-trained classification model to obtain categories of the search records in the search record set, wherein the classification model is used to characterize a correspondence between the feature vectors of the search records and the categories of the search records, and the categories of the search records including a point of interest category and a non-point-of-interest category; a third selection unit, configured for selecting from search records of the point of interest category in the search record set a third set of points of interest; and a second addition unit, configured for adding the third set of points of interest to the set of points of interest.

In some embodiments, the extraction unit includes: a first acquisition subunit, configured for acquiring respectively feature data of the search records in the search record set, wherein the feature data includes at least one of: a search formula, a uniform resource locator, a search time, a search volume, a click time and a click volume; and a first extraction subunit, configured for extracting respectively the feature vectors of the search records in the search record set from the feature data of the search records in the search record set.

In some embodiments, the apparatus further includes a training unit, the training unit including: a second acquisition subunit, configured for acquiring a sample search record and a category of the sample search record; a second extraction subunit, configured for extracting a feature vector of the sample search record; and a training subunit, configured for training, using a machine learning method, to obtain the classification model, by using the feature vector of the sample search record as an input, and the category of the sample search record as an output.

In some embodiments, the apparatus further includes: a second acquisition unit, configured for acquiring periodically a periodic search record set, wherein a periodic search record includes a periodic search formula and a periodic search volume; a match unit, configured for matching respectively points of interest in the set of points of interest in the periodic search record set, acquiring periodic search volumes of successfully matched periodic search records as search volumes of the points of interest in the set of points of interest; a determination unit, configured for determining respectively whether the search volumes of the points of interest in the set of points of interest is less than a search volume threshold; and a deletion unit, configured for deleting points of interest of search volumes less than the search volume threshold from the set of points of interest.

In a third aspect, the embodiments of the present disclosure provide a server, the server including: one or more processors; a storage apparatus, to store one or more programs; and when the one or more programs being executed by the one or more processors, cause the one or more processors to implement the method as described in any of the implementations in the first aspect.

In a fourth aspect, the embodiments of the present disclosure provide a computer readable storage medium, storing a computer program thereon, the computer program, when executed by a processor, implements the method as described in any of the implementations in the first aspect.

The artificial intelligence based method and apparatus for processing information provided by the embodiments of the present disclosure firstly acquire a search record set within a preset time period; then match the search record set with an encyclopedia entry set and select a first set of points of interest from the encyclopedia entry set according to a match result, match the search record set with a microblog topic set and select a second set of points of interest from the microblog topic set according to a match result; finally add the first set of points of interest and the second set of points of interest to a set of points of interest. By processing the search record set through artificial intelligence then acquiring the set of points of interest automatically, the present disclosure achieves an accurate acquisition of the point of interest, thus facilitating the implementation of a targeted information push.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
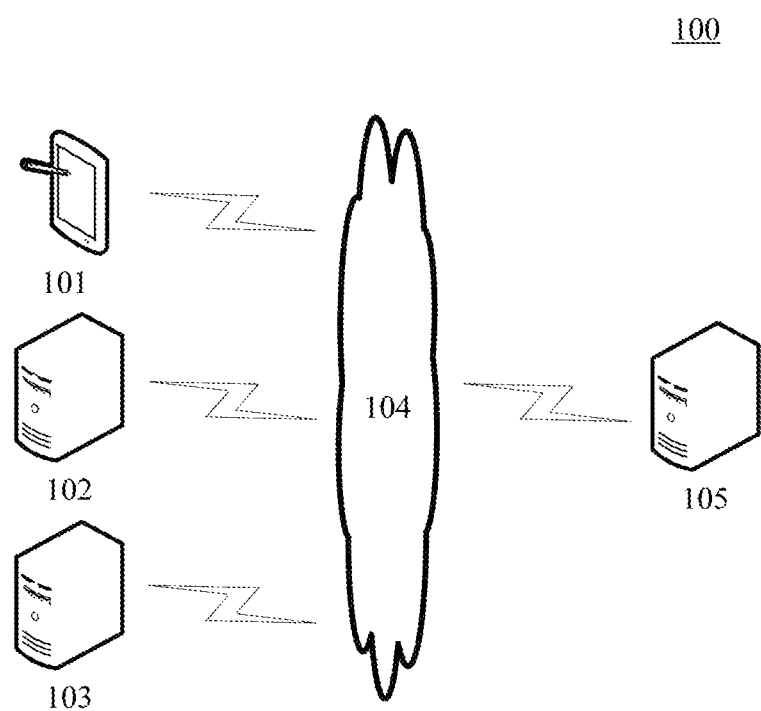
FIG. 1 is an exemplary system architecture diagram in which the present disclosure may be applied.

FIG. 1 shows an illustrative architecture of a system 100 which may be used by an artificial intelligence based method for processing information or an artificial intelligence based apparatus for processing information according to the embodiments of the present application.

As shown in FIG. 1, the system architecture 100 may include a terminal device 101, a network 104 and servers 102, 103 and 105. The network 104 serves as a medium providing a communication link between the terminal device 101 and the server 102, 103 and 105. The network 104 may include various types of connections, such as wired or wireless transmission links, or optical fibers.

The user 110 may use the terminal device 101 to interact with the servers 102, 103 or 105 through the network 104, in order to transmit or receive messages, etc. For example, the user may use the terminal device 101 to send a search record set within a preset time period to the servers 102, 103 or 105 through the network 104. The terminal device 101 may be various electronic devices, including but not limited to, smart phones, tablet computers, e-book readers, laptop computers and desktop computers.

The server 102, 103 may be backend servers of various websites. For example, the server 102 may be a backend server of an encyclopedia website for storing an encyclopedia entry set. The server 103 may also be a backend server of a microblog website for storing a microblog topic set.

The server 105 may provide various services. For example, the server 105 may acquire a search record set within a preset time period from the terminal device 101, process such as analyze the acquired search record set, and obtain a processing result (such as a set of points of interest).

It needs to be noted that the artificial intelligence based method for processing information provided by the embodiments of the present disclosure is generally executed by the server 105, accordingly, the artificial intelligence based apparatus for processing information is generally provided in the server 105.

It should be understood that the numbers of the terminal devices, the networks and the servers in FIG. 1 are merely illustrative. Any number of terminal devices, networks and servers may be provided based on the implementation requirements. The server 105 may further acquire a search record set within a preset time period from a backend server of a search website. When the server 105 acquires the search record set within the preset time period from the backend server of the search website, the terminal device 101 provided in the system architecture 100 may be replaced with the backend server of the search website.

Figure 2:
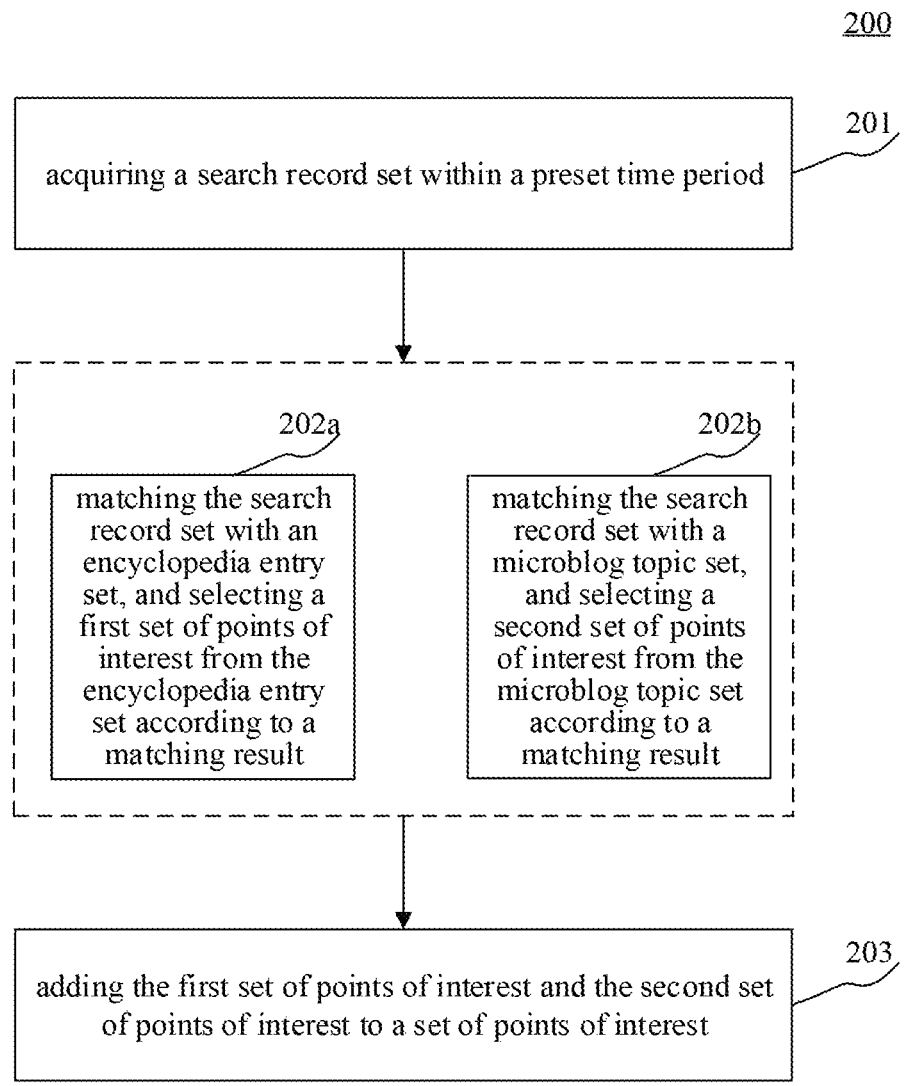
FIG. 2 is a flowchart of an embodiment of an artificial intelligence based method for processing information according to the present disclosure.

With further reference to FIG. 2, a flow 200 of an embodiment of the artificial intelligence based method for processing information according to the present disclosure is illustrated. The artificial intelligence based method for processing information includes the following steps:

Step 201, acquiring a search record set within a preset time period.

In the present embodiment, the electronic device (e.g., the server 105 as shown in FIG. 1) on which the artificial intelligence based method for processing information runs may firstly acquire a search record set within a preset time period (for example, one week, one month, one quarter) from a terminal device (such as the terminal device 101 as shown in FIG. 1) or the backend server of a search website through a wired connection or a wireless connection; and then continue to perform steps 202a and 202b. Here, the search record may include, but not limited to, at least one of the following: a search formula, a URL (Uniform Resource Locator), a search time, a search volume, a click time, a click volume, and the like.

Step 202a, matching the search record set with an encyclopedia entry set, and selecting a first set of points of interest from the encyclopedia entry set according to a match result.

In the present embodiment, based on the search record set acquired in step 201, the electronic device may firstly acquire an encyclopedia entry set from the backend server (for example, the server 102 as shown in FIG. 1) of an encyclopedia website; and then match the search record set with the encyclopedia entry set and select a first set of points of interest from the encyclopedia entry set according to the match result. Here, an encyclopedia entry may also be referred to as an encyclopedia clause. It is a specific manifestation of an entry used to refer to entries in the encyclopedia, and is a basic unit forming the encyclopedia. The encyclopaedia may be in the form of paper and Network and other different carriers. The encyclopedia entry may include the entry name and the entry content.

In the present embodiment, the electronic device may match search formulae of the search records in the search record set with the entry contents of the encyclopedia entries in the encyclopedia entry set. If the degree of match between the search formula of a search record and the entry content of an encyclopedia entry is greater than a first preset degree-of-match threshold (for example, 0.7), the match is successful and the encyclopedia entry is determined as a successfully matched encyclopedia entry. Here, the electronic device may directly determine the entry names of the successfully matched encyclopedia entries as the first points of interest to generate the first set of points of interest. The electronic device may also select, from the successfully matched encyclopedia entries, the entry names of part of the successfully matched encyclopedia entries as the first points of interest to generate the first set of points of interest. Here, the first point of interest is usually an entity point of interest, and the entity is an objective object, for example, a person, an object, or a building.

In some alternative implementations of the present embodiment, the electronic device may firstly match the search formulae of the search records in the search record set with the entry contents of the encyclopedia entries in the encyclopedia entry set, acquire successfully matched encyclopedia entries as candidate encyclopedia entries to generate a candidate encyclopedia entry set; then select the entry names of the candidate encyclopedia entries from the candidate encyclopedia entry set as first points of interest to generate the first set of points of interest. Here, the electronic device may determine the entry names of all the candidate encyclopedia entries in the candidate encyclopedia entry set as the first points of interest to generate the first set of points of interest. The electronic device may also select, from the candidate encyclopedia entry set, the entry names of part of the candidate encyclopedia entries as the first points of interest to generate the first set of points of interest. Here, the search record may include the search formula and the search volume, and the encyclopedia entry may include the entry name and the entry content.

Here, for each search record in the search record set, the electronic device may firstly lex the search formula of the search record to acquire a keyword set of the search record; then match the keyword set of the search record respectively with the entry contents of the encyclopedia entries in the encyclopedia entry set, and determine the degree of match between the entry contents of the encyclopedia entries and the search formula of the search record based on the number of keywords in the keyword set of the search record included by the entry contents of the encyclopedia entries. For example, if the entry content of an encyclopedia entry includes all the keywords in the keyword set of the search record, it may be determined that the degree of match between the entry content of the encyclopedia entry and the search formula of the search record is 1; and if the entry content of an encyclopedia entry includes some keywords in the keyword set of the search record, the ratio of the number of the keywords in the keyword set of the search record included by the entry content of the encyclopedia entry to the number of the keywords in the keyword set of the search record may be determined as the degree of match between the entry content of the encyclopedia entry and the search formula of the search record; and if the entry content of an encyclopedia entry does not include any keyword in the keyword set of the search record, it may be determined that the degree of match between the entry content of the encyclopedia entry and the search formula of the search record is 0.

In some alternative implementations of the present embodiment, the electronic device may firstly determine respectively whether the candidate encyclopedia entries in the candidate encyclopedia entry set satisfy a first preset condition, wherein the first preset condition may include an entry category belonging to entry categories in a preset entry category set and an entry reading quantity greater than a preset entry reading quantity; then select candidate encyclopedia entries satisfying the first preset condition in the candidate encyclopedia entry set; and finally determine entry names of the selected candidate encyclopedia entries as the first points of interest to generate the first set of points of interest. Here, the encyclopedia entry may also include the entry category and the entry reading quantity. For example, the preset entry category set may include: a figure category, a company category, or a brand category. The preset entry reading quantity may be 100,000 times. For each candidate encyclopedia entry in the candidate encyclopedia entry set, the electronic device may firstly determine whether the category of the candidate encyclopedia entry belongs to the figure category, the company category, or the brand category; if yes, further determine whether the entry reading quantity of the candidate encyclopedia entry is greater than 100,000 times; if yes, determine the entry name of the candidate encyclopedia entry as the first point of interest.

Step 202b, matching the search record set with a microblog topic set, and selecting a second set of points of interest from the microblog topic set according to a match result.

In the present embodiment, based on the search record set acquired in step 201, the electronic device may firstly acquire a microblog topic set from the backend server (for example, the server 103 as shown in FIG. 1) of a microblog website; and then match the search record set with the microblog topic set and select a second set of points of interest from the microblog topic set according to the match result. Here, a microblog topic may be a special topic page relating to the topic name of a microblog topic, which is modified and edited based on the content of various channels such as microblog hotspots, personal interests and netizens' discussions. A microblog user may enter the page and post a microblog for discussion, and the microblog topic page will also automatically include related microblogs containing the topic name of the microblog topic. For example, when a microblog is posted, the double pound signs ## may be inputted and a content may be inputted between the two # symbols. In this case, the keyword between the two # symbols may be used as the topic name of the microblog topic. Here, for example, the microblog topic may include the topic name and the topic content.

In the present embodiment, the electronic device may match the search formulae of the search records in the search record set with the topic contents of the microblog topics in the microblog topic set. If the degree of match between the search formula of a search record and the topic content of a microblog topic is greater than a second preset degree-of-match threshold (for example, 0.7), the match is successful and the microblog topic is determined as a successfully matched microblog topic. Here, the electronic device may directly determine the topic names of the successfully matched microblog topics as the second points of interest to generate the second set of points of interest. The electronic device may also select, from the successfully matched microblog topics, the topic names of part of the successfully matched microblog topics as the second points of interest to generate the second set of points of interest. Here, the second point of interest is usually a topic point of interest.

In some alternative implementations of the present embodiment, the electronic device may firstly match the search formulae of the search records in the search record set with the topic contents of the microblog topics in the microblog topic set, acquire successfully matched microblog topics as candidate microblog topics to generate a candidate microblog topic set; then select the topic names of the candidate microblog topics from the candidate microblog topic set as second points of interest to generate the second set of points of interest. Here, the electronic device may determine the topic names of all the candidate microblog topics in the candidate microblog topic set as the second points of interest to generate the second set of points of interest. The electronic device may also select from the candidate microblog topic set, the topic names of part of the candidate microblog topics as the second points of interest to generate the second set of points of interest. Here, the search record may include the search formula and the search volume, and the microblog topic may include the topic name and the topic content.

Here, for each search record in the search record set, the electronic device may firstly lex the search formula of the search record to acquire a keyword set of the search record; then match the keyword set of the search record respectively with the topic contents of the microblog topics in the microblog topic set, and determine the degree of match between the topic contents of the microblog topics and the search formula of the search record based on the number of keywords in the keyword set of the search record included by the topic contents of the microblog topics. For example, if the topic content of a microblog topic includes all the keywords in the keyword set of the search record, it may be determined that the degree of match between the topic content of the microblog topic and the search formula of the search record is 1; and if the topic content of a microblog topic includes some keywords in the keyword set of the search record, the ratio of the number of the keywords in the keyword set of the search record included by the topic content of the microblog topic to the number of the keywords in the keyword set of the search record may be determined as the degree of match between the topic content of the microblog topic and the search formula of the search record; and if the topic content of a microblog topic does not include any keyword in the keyword set of the search record, it may be determined that the degree of match between the topic content of the microblog topic and the search formula of the search record is 0.

In some alternative implementations of the present embodiment, the electronic device may firstly determine respectively whether the candidate microblog topics in the candidate microblog topic set satisfy a second preset condition, wherein the second preset condition may include a topic category belonging to topic categories in a preset topic category set and a topic reading quantity greater than a preset topic reading quantity; then select candidate microblog topics satisfying the second preset condition in the candidate microblog topic set; and finally determine the topic names of the selected candidate microblog topics as the second points of interest to generate the second set of points of interest. Here, the microblog topic may also include the topic category and the topic reading quantity. For example, the preset topic category set may include: a figure category, an event category. The preset topic reading quantity may be 100,000 times. For each candidate microblog topic in the candidate microblog topic set, the electronic device may firstly determine whether the category of the candidate microblog topic belongs to the figure category, or the event category; if yes, further determine whether the topic reading quantity of the candidate microblog topic is greater than 100,000 times; if yes, determine the topic name of the candidate microblog topic as the second point of interest.

Step 203, adding the first set of points of interest and the second set of points of interest to a set of points of interest.

In the present embodiment, the electronic device may add the first set of points of interest selected in step 202a and the second set of points of interest selected in step 202b to the set of points of interest. Here, the electronic device may directly add the first set of points of interest and the second set of points of interest to the set of points of interest, or may derepeat the first set of points of interest and the second set of points of interest and then add them to the set of points of interest.

In some alternative implementations of the present embodiment, after the set of points of interest is generated, the electronic device may delete points of interest with reduced interest from the set of points of interest by the following method:

Firstly, the electronic device may acquire periodically a periodic search record set.

Specifically, the electronic device may acquire a search record set within a period at regular intervals (for example, two weeks, two months, and half a year) as a periodic search record set. Here, the periodic search record may include a periodic search formula and a periodic search volume. The periodic search volume may be the search volume of the periodic search formula in the period.

Then, the electronic device may match respectively points of interest in the set of points of interest in the periodic search record set, acquire periodic search volumes of successfully matched periodic search records as search volumes of the points of interest in the set of points of interest.

Specifically, for each point of interest in the set of points of interest, the electronic device may match the point of interest respectively with search formulae of the periodic search records in the periodic search record set. If the degree of match between the search formula of a periodic search record and the point of interest is greater than a third preset degree-of-match threshold (for example, 0.7), the match is successful and the search volume of the periodic search record is determined as the search volume of the point of interest; if the degree of match between the search formulae of all the periodic search records in the periodic search record set and the point of interest is not greater than the third preset degree-of-match threshold, the match is unsuccessful, and the search volume of the point of interest is set as 0.

Then, the electronic device may determine respectively whether the search volumes of the points of interest in the set of points of interest are less than a search volume threshold.

Specifically, for each point of interest in the set of points of interest, the electronic device may compare the search volume of the point of interest with a search volume threshold (for example, 5,000 times, 10,000 times, 50,000 times); if the search volume of the point of interest is less than the search volume threshold, the point of interest is deleted from the set of points of interest; if the search volume of the point of interest is not less than the search volume threshold, the point of interest is still reserved.

Finally, the electronic device may delete the points of interest having a search volume less than the search volume threshold from the set of points of interest.

The artificial intelligence based method for processing information provided by the embodiments of the present disclosure firstly acquires a search record set within a preset time period; then match the search record set with an encyclopedia entry set and select a first set of points of interest from the encyclopedia entry set according to a match result, match the search record set with a microblog topic set and select a second set of points of interest from the microblog topic set according to a match result; finally add the first set of points of interest and the second set of points of interest to a set of points of interest. By processing the search record set through artificial intelligence then acquiring the set of points of interest automatically, the present disclosure achieves an accurate acquisition of the points of interest, thus facilitating the implementation of a targeted information push.

Figure 3:
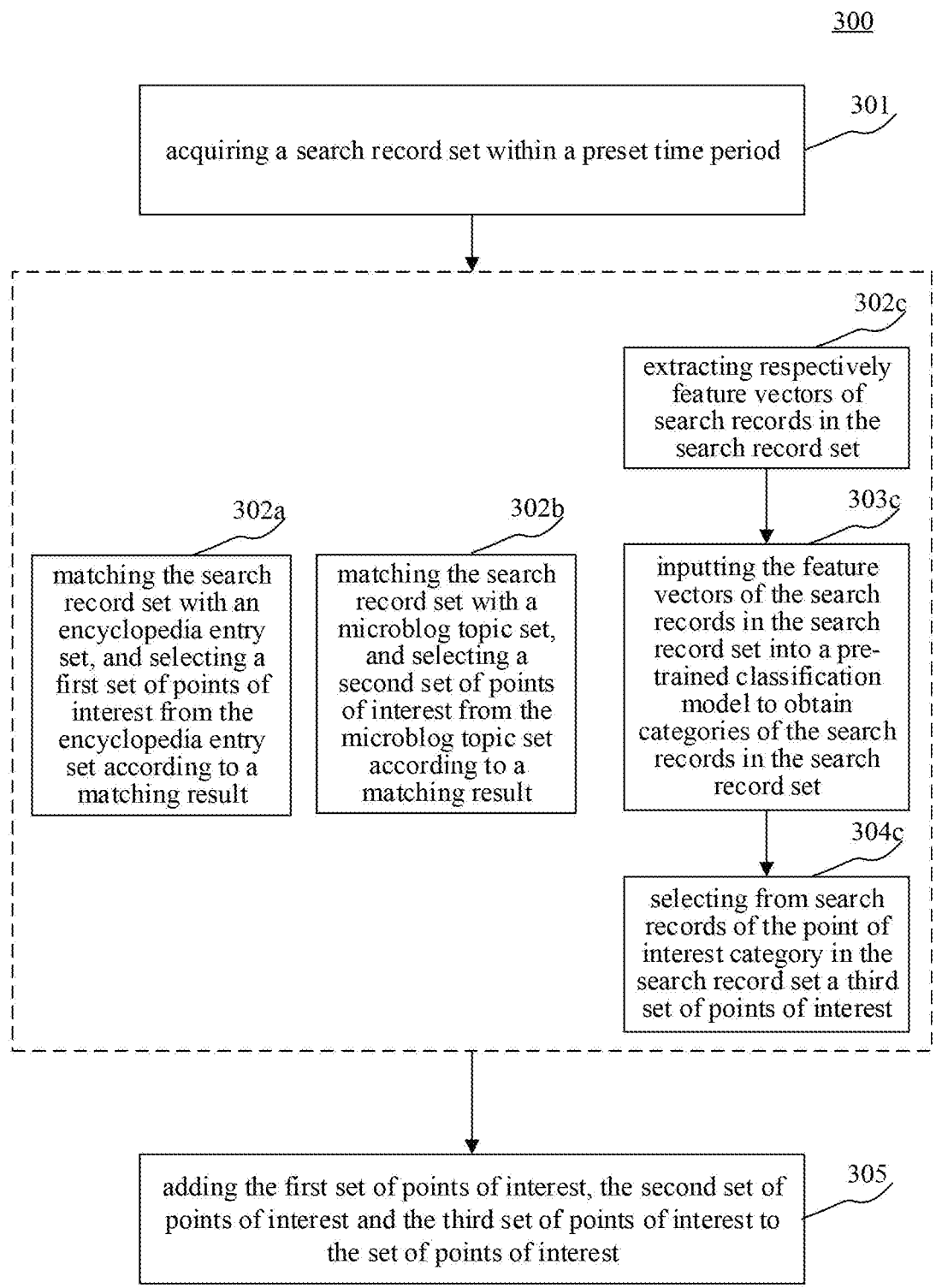
FIG. 3 is a flowchart of another embodiment of the artificial intelligence based method for processing information according to the present disclosure.

With further reference to FIG. 3, a flow 300 of another embodiment of the artificial intelligence based method for processing information is illustrated. The flow 300 of the artificial intelligence based method for processing information includes the following steps:

Step 301, acquiring a search record set within a preset time period.

In the present embodiment, the electronic device (e.g., the server 105 as shown in FIG. 1) on which the artificial intelligence based method for processing information runs may firstly acquire a search record set within a preset time period (for example, one week, one month, one quarter) from a terminal device (such as the terminal device 101 as shown in FIG. 1) or the backend server of a search website through a wired connection or a wireless connection; and then continue to perform steps 302a, 302b and 302c.

Step 302a, matching the search record set with an encyclopedia entry set, and selecting a first set of points of interest from the encyclopedia entry set according to a match result.

Step 302b, matching the search record set with a microblog topic set, and selecting a second set of points of interest from the microblog topic set according to a match result.

Step 302a and step 302b in the present embodiment may have a similar implementation mode to step 202a and step 202b shown in FIG. 2, and detailed description thereof is omitted.

Step 302c, extracting respectively feature vectors of search records in the search record set.

In the present embodiment, for each search record in the search record set acquired in step 301, the electronic device may firstly extract the feature vector of the search record; then continue to perform step 303c. Here, the feature vector of the search record may be used to describe the content of the search record.

In some alternative implementations of the present embodiment, the electronic device may firstly acquire respectively feature data of the search records in the search record set; then extract respectively the feature vectors of the search records in the search record set from the feature data of the search records in the search record set. Here, the feature data may include, but not limited to, at least one of: a search formula, a URL, a search time, a search volume, a click time and a click volume. For example, a complete URL may typically include a protocol type, a domain name, a path and a parameter, etc. The electronic device may generalize the URL of a search record, remove the protocol type, path and parameter of the URL of the search record, and retain only the domain name of the URL of the search record and use the domain name of the URL of the search record as the feature vector of the search record.

Step 303c, inputting the feature vectors of the search records in the search record set into a pre-trained classification model to obtain categories of the search records in the search record set.

In the present embodiment, for the feature vector of each search record in the search record set extracted in step 302c, the electronic device may firstly input the feature vector of the search record into a pre-trained classification model for classification to obtain the category of the search record; then continue to perform step 304c. Here, the category of the search record may include the point of interest category and the non-point-of-interest category.

In the present embodiment, the classification model may be used to characterize the correspondence between the feature vectors of the search records and the categories of the search records. The electronic device may train the classification model using various methods.

In some alternative implementations of the present embodiment, the electronic device may generate, based on the statistics of the feature vectors of a large number of search records and the categories of the search records, a correspondence table storing the correspondence between the feature vectors of a plurality of search records and the categories of the search records, and determine the correspondence table as the classification model.

In some alternative implementations of the present embodiment, the electronic device may also train the classification model according to the following steps:

Firstly, the electronic device may acquire a sample search record and a category of the sample search record.

Specifically, those skilled in the art may select a part of the search records from the search record set as the sample search record; and then perform manual analysis on the sample search record to obtain the category of the sample search record.

Then, the electronic device may extract a feature vector of the sample search record.

Specifically, the electronic device may firstly acquire feature data of the sample search record; then extract respectively feature vectors from the feature data of the sample search record. Here, the feature data may include, but not limited to, at least one of: a search formula, a URL, a search time, a search volume, a click time and a click volume.

Finally, the electronic device may train, using a machine learning method, to obtain the classification model, by using the feature vector of the sample search record as an input, and the category of the sample search record as an output.

Specifically, the electronic device may train, for example, a Deep Convolutional Neural Network (DCNN), using a machine learning method, to obtain a classification model capable of establishing an accurate correspondence between the feature vectors of the search records and the categories of the search records, by using the feature vector of the sample search record as an input, and the category of the sample search record as an output.

Step 304c, selecting from the search records of the point of interest category in the search record set a third set of points of interest.

In the present embodiment, based on the categories of the search records in the search record set obtained in step 303c, the electronic device may firstly select search records having the categories of the point of interest category from the search record set; then select a third set of points of interest from the selected search records; finally continue to perform step 305. Here, the third set of points of interest usually includes both entity points of interest and topic points of interest.

In the present embodiment, the electronic device may directly determine the search formulae in the selected search records as the third points of interest to generate the third set of points of interest. The electronic device may further process the search formulae in the selected search records, and then determine the processed search formulae as the third points of interest to generate the third set of points of interest. For example, for the search formulae in the selected search records, it may be possible to remove the addressing search formulae therein, or remove the prefix and suffix in the search formulae.

Step 305, adding the first set of points of interest, the second set of points of interest and the third set of points of interest to the set of points of interest.

In the present embodiment, the electronic device may add the first set of points of interest selected in step 302a, the second set of points of interest selected in step 302b and the third set of points of interest selected in step 304c to the set of points of interest. Here, the electronic device may directly add the first set of points of interest, the second set of points of interest and the third set of points of interest to the set of points of interest, or may derepeat the first set of points of interest, the second set of points of interest and the third set of points of interest, then add them to the set of points of interest.

As can be seen from FIG. 3, compared with the corresponding embodiment in FIG. 2, the flow 300 of the artificial intelligence based method for processing information in the present embodiment adds the step of selecting a third set of points of interest from the search record set. Therefore, the points of interest in the set of points of interest generated by the solution described in the present embodiment are more comprehensive and rich.

Figure 4:
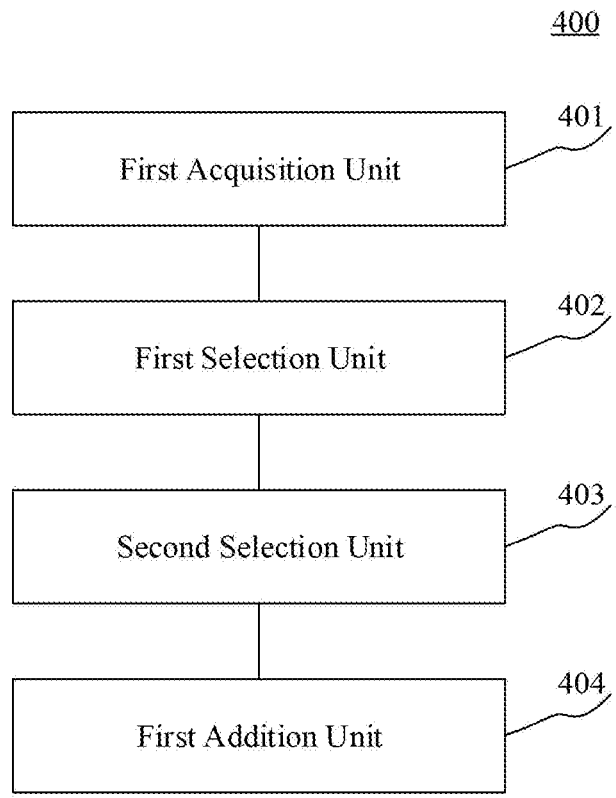
FIG. 4 is a schematic structural diagram of an embodiment of an artificial intelligence based apparatus for processing information according to the present disclosure.

With further reference to FIG. 4, as an implementation to the method shown in the above figures, the present disclosure provides an embodiment of an artificial intelligence based apparatus for processing information. The apparatus embodiment corresponds to the method embodiment shown in FIG. 2, and the apparatus may be specifically applied to various electronic devices.

As shown in FIG. 4, the artificial intelligence based apparatus for processing information 400 of the present embodiment includes: a first acquisition unit 401, a first selection unit 402, a second selection unit 403 and a first addition unit 404. Here, the first acquisition unit 401 is configured for acquiring a search record set within a preset time period. The first selection unit 402 is configured for matching the search record set with an encyclopedia entry set, and selecting a first set of points of interest from the encyclopedia entry set according to a match result. The second selection unit 403 is configured for matching the search record set with a microblog topic set, and selecting a second set of points of interest from the microblog topic set according to a match result. The first addition unit 404 is configured for adding the first set of points of interest and the second set of points of interest to a set of points of interest.

In the present embodiment, in the artificial intelligence based apparatus for processing information 400, the specific processing of and the technical effects brought by the first acquisition unit 401, the first selection unit 402, the second selection unit 403 and the first addition unit 404 may respectively refer to the related descriptions of the steps 201, 202, 203 and 204 in the corresponding embodiment in FIG. 2, and detailed description thereof is omitted.

In some alternative implementations of the present embodiment, a search record may include a search formula and a search volume, an encyclopedia entry may include an entry name and an entry content; and the first selection unit 402 may include: a first match subunit (not shown in the figure), configured for matching search formulae of search records in the search record set with entry contents of encyclopedia entries in the encyclopedia entry set, acquiring successfully matched encyclopedia entries as candidate encyclopedia entries to generate a candidate encyclopedia entry set; and a first selection subunit (not shown in the figure), configured for selecting entry names of the candidate encyclopedia entries from the candidate encyclopedia entry set as first points of interest to generate the first set of points of interest.

In some alternative implementations of the present embodiment, an encyclopedia entry may further include an entry category and an entry reading quantity; and the first selection subunit 402 may include: a first determination module (not shown in the figure), configured for determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity; a first selection module (not shown in the figure), configured for selecting candidate encyclopedia entries satisfying the first preset condition in the candidate encyclopedia entry set; and a first generation module (not shown in the figure), configured for determining entry names of the selected candidate encyclopedia entries as the first points of interest to generate the first set of points of interest.

In some alternative implementations of the present embodiment, a search record may include a search formula and a search volume, a microblog topic may include a topic name and a topic content; and the second selection unit 403 may include: a second match subunit (not shown in the figure), configured for matching search formulae of search records in the search record set with topic contents of microblog topics in the microblog topic set, acquiring successfully matched microblog topics as candidate microblog topics to generate a candidate microblog topic set; and a second selection subunit (not shown in the figure), configured for selecting topic names of the candidate microblog topics from the candidate microblog topic set as second points of interest to generate the second set of points of interest.

In some alternative implementations of the present embodiment, the microblog topic may further include a topic category and a topic reading quantity; and the second selection subunit may include: a second determination module (not shown in the figure), configured for determining respectively whether the candidate microblog topics in the candidate microblog topic set satisfying a second preset condition, wherein the second preset condition includes a topic category of topic categories in a preset topic category set and a topic reading quantity greater than a preset topic reading quantity; a second selection module (not shown in the figure), configured for selecting candidate microblog topics satisfying the second preset condition in the candidate microblog topic set; and a second generation module (not shown in the figure), configured for determining topic names of the selected candidate microblog topics as the second points of interest to generate the second set of points of interest.

In some alternative implementations of the present embodiment, the artificial intelligence based apparatus for processing information 400 further includes: an extraction unit (not shown in the figure), configured for extracting respectively feature vectors of search records in the search record set; a classification unit (not shown in the figure), configured for inputting the feature vectors of the search records in the search record set into a pre-trained classification model to obtain categories of the search records in the search record set, wherein the classification model is used to characterize a correspondence between the feature vectors of the search records and the categories of the search records, and the categories of the search records including a point of interest category and a non-point-of-interest category; a third selection unit (not shown in the figure), configured for selecting from search records of the point of interest category in the search record set a third set of points of interest; and a second addition unit (not shown in the figure), configured for adding the third set of points of interest to the set of points of interest.

In some alternative implementations of the present embodiment, the extraction unit may include: a first acquisition subunit (not shown in the figure), configured for acquiring respectively feature data of the search records in the search record set, wherein the feature data includes at least one of: a search formula, a uniform resource locator, a search time, a search volume, a click time and a click volume; and a first extraction subunit (not shown in the figure), configured for extracting respectively the feature vectors of the search records in the search record set from the feature data of the search records in the search record set.

In some alternative implementations of the present embodiment, the artificial intelligence based apparatus for processing information 400 may further include a training unit (not shown in the figure), the training unit may include: a second acquisition subunit (not shown in the figure), configured for acquiring a sample search record and a category of the sample search record; a second extraction subunit (not shown in the figure), configured for extracting a feature vector of the sample search record; and a training subunit (not shown in the figure), configured for training, using a machine learning method, to obtain the classification model, by using the feature vector of the sample search record as an input, and the category of the sample search record as an output.

In some alternative implementations of the present embodiment, the artificial intelligence based apparatus for processing information 400 may further include: a second acquisition unit (not shown in the figure), configured for acquiring periodically a periodic search record set, wherein a periodic search record includes a periodic search formula and a periodic search volume; a match unit (not shown in the figure), configured for matching respectively points of interest in the set of points of interest in the periodic search record set, acquiring periodic search volumes of successfully matched periodic search records as search volumes of the points of interest in the set of points of interest; a determination unit (not shown in the figure), configured for determining respectively whether the search volumes of the points of interest in the set of points of interest is less than a search volume threshold; and a deletion unit (not shown in the figure), configured for deleting points of interest of search volumes less than the search volume threshold from the set of points of interest.

Figure 5:
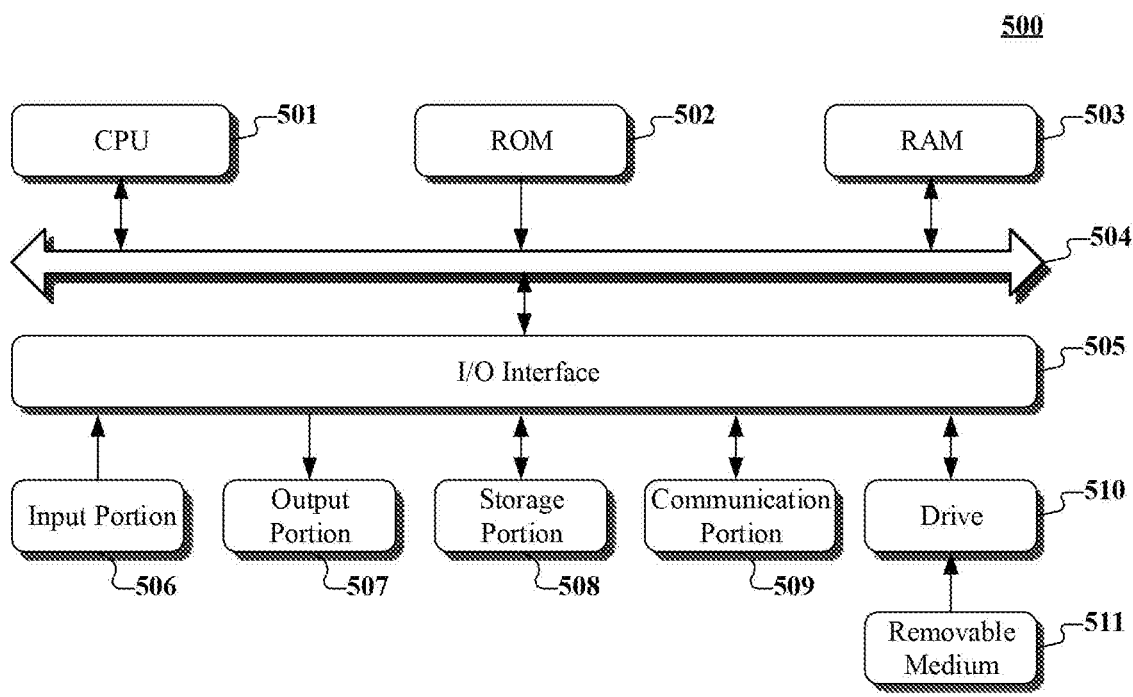
FIG. 5 is a schematic structural diagram of a computer system adapted to implement a server of embodiments of the present disclosure.

With reference to FIG. 5, a schematic structural diagram of a computer system 500 adapted to implement a server of the embodiments of the present disclosure is illustrated. The server shown in FIG. 5 is merely an example and should not impose any restriction on the functions and the scope of use of the embodiments of the present disclosure.

As shown in FIG. 5, the computer system 500 includes a central processing unit (CPU) 1101, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse, etc.; an output portion 507 including such as a cathode ray tube (CRT), a liquid crystal display (LCD) and a loudspeaker, etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, a semiconductor memory, is installed on the drive 510 as needed, to facilitate the retrieval of a computer program from the removable medium 511, and the installation thereof on the storage portion 508 as needed.

In particular, according to the embodiments of the present disclosure, the process described above with reference to the flowchart may be implemented in a computer software program. For example, the embodiments of the present disclosure include a computer program product, which comprises a computer program that is embedded in a computer readable medium. The computer program comprises program codes for executing the method as illustrated in the flowchart. In such embodiments, the computer program may be downloaded and installed from a network via the communication portion 509, and/or be installed from the removable media 511. The computer program, when executed by the central processing unit (CPU) 501, implements the above mentioned functionalities as defined by the method of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flowcharts and block diagrams in the accompanying drawings illustrate system architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may also occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flowcharts and a combination of the blocks in the block diagrams and/or the flowcharts may be implemented by a dedicated hardware-based system executing specific functions or operations, or by a combination of a dedicated hardware and computer instructions.

The units involved in the embodiments of the present disclosure may be implemented by way of software or hardware. The described units may also be provided in a processor, for example, described as: a processor, comprising a first acquisition unit, a first selection unit, a second selection unit, and a first addition unit. Here, the names of these units are not considered as limitations to the units in certain circumstances. For example, the first acquisition unit may also be described as "the unit configured for acquiring a search record set within a preset time period."

In another aspect, the present disclosure further provides a computer readable medium. The computer readable medium may be included in the server described in the above embodiments, or a stand-alone computer readable medium which has not been assembled into the server. The computer readable medium carries one or more programs. The one or more programs, when executed by the server, cause the server to: acquire a search record set within a preset time period; match the search record set with an encyclopedia entry set, and select a first set of points of interest from the encyclopedia entry set according to a match result; match the search record set with a microblog topic set, and select a second set of points of interest from the microblog topic set according to a match result; and add the first set of points of interest and the second set of points of interest to a set of points of interest.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An artificial intelligence based method for processing information, the method comprising:
    acquiring a search record set within a preset time period;
    matching search formulae of search records in the search record set with entry contents of encyclopedia entries in an encyclopedia entry set, wherein a search record comprises a search formula and a search volume,
    acquiring successfully matched encyclopedia entries as candidate encyclopedia entries to generate a candidate encyclopedia entry set;
    determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity;
    selecting candidate encyclopedia entries satisfying the first preset condition in the candidate encyclopedia entry set, wherein an encyclopedia entry comprises an entry name, an entry content, an entry category and an entry reading quantity;

determining entry names of the selected candidate encyclopedia entries as first points of interest to generate a first set of points of interest;

matching the search record set with a microblog topic set, and selecting a second set of points of interest from the microblog topic set according to a match result;

extracting respectively feature vectors of search records in the search record set;

inputting the feature vectors of the search records in the search record set into a pre-trained classification model to obtain categories of the search records in the search record set, wherein the classification model is used to characterize a correspondence between the feature vectors of the search records and the categories of the search records, and the categories of the search records including the point of interest category and a non-point-of-interest category;

selecting from search records of a point of interest category in the search record set a third set of points of interest; and adding the first set of points of interest, the second set of points of interest and the third set of points of interest to a set of points of interest.

2. The method according to claim 1, wherein a search record comprises a search formula and a search volume, a microblog topic comprises a topic name and a topic content; and the matching the search record set with a microblog topic set, and selecting a second set of points of interest from the microblog topic set according to a match result comprises:

matching search formulae of search records in the search record set with topic contents of microblog topics in the microblog topic set, acquiring successfully matched microblog topics as candidate microblog topics to generate a candidate microblog topic set; and selecting topic names of the candidate microblog topics from the candidate microblog topic set as second points of interest to generate the second set of points of interest.

3. The method according to claim 2, wherein the microblog topic further comprises a topic category and a topic reading quantity; and the selecting topic names of the candidate microblog topics from the candidate microblog topic set as second points of interest to generate the second set of points of interest comprises:

determining respectively whether the candidate microblog topics in the candidate microblog topic set satisfying a second preset condition, wherein the second preset condition includes a topic category of topic categories in a preset topic category set and a topic reading quantity greater than a preset topic reading quantity;

selecting candidate microblog topics satisfying the second preset condition in the candidate microblog topic set; and determining topic names of the selected candidate microblog topics as the second points of interest to generate the second set of points of interest.

4. The method according to claim 1, wherein the method further comprises training the classification model, the training the classification model comprising:

acquiring a sample search record and a category of the sample search record;

extracting a feature vector of the sample search record; and training, using a machine learning method, to obtain the classification model, by using the feature vector of the sample search record as an input, and the category of the sample search record as an output.

5. The method according to claim 1, wherein the method further comprises:

acquiring periodically a periodic search record set, wherein a periodic search record includes a periodic search formula and a periodic search volume;

matching respectively points of interest in the set of points of interest in the periodic search record set, acquiring periodic search volumes of successfully matched periodic search records as search volumes of the points of interest in the set of points of interest;

determining respectively whether the search volumes of the points of interest in the set of points of interest is less than a search volume threshold;

deleting points of interest of search volumes less than the search volume threshold from the set of points of interest.

6. The method according to claim 1, wherein the extracting respectively feature vectors of search records in the search record set comprises:

acquiring respectively feature data of the search records in the search record set, wherein the feature data includes at least one of: a search formula, a uniform resource locator, a search time, a search volume, a click time and a click volume; and extracting respectively the feature vectors of the search records in the search record set from the feature data of the search records in the search record set.

7. An artificial intelligence based apparatus for processing information, the apparatus comprising:

at least one processor; and a memory storing instructions, the instructions when executed by the at least one processor, cause the at least one processor to perform operations, the operations comprising:

acquiring a search record set within a preset time period;

matching search formulae of search records in the search record set with entry contents of encyclopedia entries in an encyclopedia entry set, wherein a search record comprises a search formula and a search volume, acquiring successfully matched encyclopedia entries as candidate encyclopedia entries to generate a candidate encyclopedia entry set;

determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity;

selecting candidate encyclopedia entries satisfying the first preset condition in the candidate encyclopedia entry set, wherein an encyclopedia entry comprises an entry name, an entry content, an entry category and an entry reading quantity;

determining entry names of the selected candidate encyclopedia entries as first points of interest to generate a first set of points of interest;

matching the search record set with a microblog topic set, and selecting a second set of points of interest from the microblog topic set according to a match result;

extracting respectively feature vectors of search records in the search record set;

inputting the feature vectors of the search records in the search record set into a pre-trained classification model to obtain categories of the search records in the search record set, wherein the classification model is used to characterize a correspondence between the feature vectors of the search records and the categories of the search records, and the categories of the search records including the point of interest category and a non-point-of-interest category;

selecting from search records of a point of interest category in the search record set a third set of points of interest; and adding the first set of points of interest, the second set of points of interest and the third set of points of interest to a set of points of interest.

8. The apparatus according to claim 7, wherein a search record comprises a search formula and a search volume, an encyclopedia entry comprises an entry name and an entry content; and the matching the search record set with an encyclopedia entry set, and selecting a first set of points of interest from the encyclopedia entry set according to a match result comprises:

matching search formulae of search records in the search record set with entry contents of encyclopedia entries in the encyclopedia entry set, acquiring successfully matched encyclopedia entries as candidate encyclopedia entries to generate a candidate encyclopedia entry set; and selecting entry names of the candidate encyclopedia entries from the candidate encyclopedia entry set as first points of interest to generate the first set of points of interest.

9. The apparatus according to claim 8, wherein an encyclopedia entry further comprises an entry category and an entry reading quantity; and the selecting entry names of the candidate encyclopedia entries from the candidate encyclopedia entry set as first points of interest to generate the first set of points of interest comprises:

determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity;

selecting candidate encyclopedia entries satisfying the first preset condition in the candidate encyclopedia entry set; and determining entry names of the selected candidate encyclopedia entries as the first points of interest to generate the first set of points of interest.

10. The apparatus according to claim 7, wherein a search record comprises a search formula and a search volume, a microblog topic comprises a topic name and a topic content; and the matching the search record set with a microblog topic set, and selecting a second set of points of interest from the microblog topic set according to a match result comprises:

matching search formulae of search records in the search record set with topic contents of microblog topics in the microblog topic set, acquiring successfully matched microblog topics as candidate microblog topics to generate a candidate microblog topic set; and selecting topic names of the candidate microblog topics from the candidate microblog topic set as second points of interest to generate the second set of points of interest.

11. The apparatus according to claim 10, wherein the microblog topic further comprises a topic category and a topic reading quantity; and the selecting topic names of the candidate microblog topics from the candidate microblog topic set as second points of interest to generate the second set of points of interest comprises:

determining respectively whether the candidate microblog topics in the candidate microblog topic set satisfying a second preset condition, wherein the second preset condition includes a topic category of topic categories in a preset topic category set and a topic reading quantity greater than a preset topic reading quantity;

selecting candidate microblog topics satisfying the second preset condition in the candidate microblog topic set; and determining topic names of the selected candidate microblog topics as the second points of interest to generate the second set of points of interest.

12. The apparatus according to claim 7, wherein the operations further comprise training the classification model, the training the classification model comprising:

acquiring a sample search record and a category of the sample search record;

extracting a feature vector of the sample search record; and training, using a machine learning method, to obtain the classification model, by using the feature vector of the sample search record as an input, and the category of the sample search record as an output.

13. The apparatus according to claim 7, wherein the operations further comprise:

acquiring periodically a periodic search record set, wherein a periodic search record includes a periodic search formula and a periodic search volume;

matching respectively points of interest in the set of points of interest in the periodic search record set, acquiring periodic search volumes of successfully matched periodic search records as search volumes of the points of interest in the set of points of interest;

determining respectively whether the search volumes of the points of interest in the set of points of interest is less than a search volume threshold; and deleting points of interest of search volumes less than the search volume threshold from the set of points of interest.

14. A non-transitory computer storage medium storing a computer program, the computer program when executed by one or more processors, causes the one or more processors to perform operations, the operations comprising:

acquiring a search record set within a preset time period;

matching search formulae of search records in the search record set with entry contents of encyclopedia entries in an encyclopedia entry set, wherein a search record comprises a search formula and a search volume, acquiring successfully matched encyclopedia entries as candidate encyclopedia entries to generate a candidate encyclopedia entry set;

determining respectively whether the candidate encyclopedia entries in the candidate encyclopedia entry set satisfying a first preset condition, wherein the first preset condition includes an entry category of entry categories in a preset entry category set and an entry reading quantity greater than a preset entry reading quantity;

selecting candidate encyclopedia entries satisfying the first preset condition in the candidate encyclopedia entry set, wherein an encyclopedia entry comprises an entry name, an entry content, an entry category and an entry reading quantity;

determining entry names of the selected candidate encyclopedia entries as first points of interest to generate a first set of points of interest;

matching the search record set with a microblog topic set, and selecting a second set of points of interest from the microblog topic set according to a match result;

extracting respectively feature vectors of search records in the search record set;

inputting the feature vectors of the search records in the search record set into a pre-trained classification model to obtain categories of the search records in the search record set, wherein the classification model is used to characterize a correspondence between the feature vectors of the search records and the categories of the search records, and the categories of the search records including the point of interest category and a non-point-of-interest category;

selecting from search records of a point of interest category in the search record set a third set of points of interest; and adding the first set of points of interest, the second set of points of interest and the third set of points of interest to a set of points of interest.

* * * * *